US 8,512,181 B2

(12) United States Patent
Mitsubori et al.

(10) Patent No.: US 8,512,181 B2
(45) Date of Patent: Aug. 20, 2013

(54) POWER UNIT FOR SMALL VEHICLE

(75) Inventors: Toshimasa Mitsubori, Saitama (JP);
Erika Hara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1234 days.

(21) Appl. No.: 11/978,709

(22) Filed: Oct. 30, 2007

(65) Prior Publication Data

US 2008/0182688 A1    Jul. 31, 2008

(30) Foreign Application Priority Data

Nov. 30, 2006   (JP) ................................. 2006-324988

(51) Int. Cl.
*F16H 55/56*   (2006.01)
*F02B 63/00*   (2006.01)
*F02B 41/00*   (2006.01)

(52) U.S. Cl.
USPC .................................... 474/8; 123/2; 123/22

(58) Field of Classification Search
USPC ........... 474/43, 148, 144, 149, 150, 8; 123/2, 123/22
See application file for complete search history.

(56) References Cited

U.S. PATENT DOCUMENTS

| | | | | |
|---|---|---|---|---|
| 501,658 A | * | 7/1893 | Parker | 187/311 |
| 510,283 A | * | 12/1893 | McIntyre | 474/29 |
| 920,363 A | * | 5/1909 | Merrill | 74/640 |
| 1,375,053 A | * | 4/1921 | Lewellen | 474/43 |
| 1,416,745 A | * | 5/1922 | Peters | 474/25 |
| 1,434,992 A | * | 11/1922 | Clay | 474/31 |
| 1,546,996 A | * | 7/1925 | Reeves | 474/31 |
| 1,854,018 A | * | 4/1932 | Carlberg | 474/33 |
| 1,899,953 A | * | 3/1933 | Goeser | 474/89 |
| 2,037,436 A | * | 4/1936 | Roddewig et al. | 474/46 |
| 2,078,196 A | * | 4/1937 | Heyer | 474/39 |
| 2,079,351 A | * | 5/1937 | Judelshon | 474/248 |
| 2,081,641 A | * | 5/1937 | Potter | 474/27 |
| 2,107,483 A | * | 2/1938 | Knight | 474/26 |
| 2,152,207 A | * | 3/1939 | Needham | 474/27 |
| 2,157,757 A | * | 5/1939 | Jacobsen | 474/27 |
| 2,170,212 A | * | 8/1939 | Pfleger | 474/23 |
| 2,189,294 A | * | 2/1940 | Pfleger | 474/29 |
| 2,200,101 A | * | 5/1940 | Schmitter | 474/25 |
| 2,201,357 A | * | 5/1940 | Twomley | 474/26 |

(Continued)

FOREIGN PATENT DOCUMENTS

| | | |
|---|---|---|
| CN | 2573694 Y | 9/2003 |
| DE | 40 29 710 C2 | 1/1998 |

(Continued)

*Primary Examiner* — William A Rivera
*Assistant Examiner* — Henry Liu
(74) *Attorney, Agent, or Firm* — Birch, Stewart, Kolasch & Birch, LLP

(57) ABSTRACT

A power unit including an internal combustion engine with a crankshaft and a power transmission system. The power transmission system being equipped with a belt-type continuously variable transmission having a drive shaft and a driven shaft. The belt-type continuously variable transmission being disposed below the axis of the crankshaft wherein the torque from the crankshaft is transmitted to the drive shaft for rotating the crankshaft and the drive shaft rotate in opposite directions. An output shaft, linked and interlocked with the driven shaft via a gear transmission system, is disposed above the continuously variable transmission. A gear transmission mechanism includes a single idle shaft, which has an axis parallel to the crankshaft, and being arranged between the driven shaft and the output shaft for rotating the driven shaft and the output shaft in the same direction.

18 Claims, 6 Drawing Sheets

(56) References Cited

U.S. PATENT DOCUMENTS

| | | | | |
|---|---|---|---|---|
| 2,205,976 A | * | 6/1940 | Heyer | 474/29 |
| 2,273,478 A | * | 2/1942 | Thompson | 474/33 |
| 2,293,617 A | * | 8/1942 | Myers | 474/36 |
| 2,308,813 A | * | 1/1943 | Johnson | 474/27 |
| 2,321,494 A | * | 6/1943 | Krag | 474/46 |
| 2,342,604 A | * | 2/1944 | Shaw | 474/27 |
| 2,486,095 A | * | 10/1949 | Armstrong | 180/223 |
| 2,522,352 A | * | 9/1950 | Eserkaln et al. | 474/27 |
| 2,528,686 A | * | 11/1950 | Brown | 474/89 |
| 2,546,856 A | * | 3/1951 | Frazier | 474/27 |
| 2,613,544 A | * | 10/1952 | Cullman | 474/88 |
| 2,640,365 A | * | 6/1953 | Michie | 474/43 |
| 2,672,761 A | * | 3/1954 | Nelson | 474/20 |
| 2,697,361 A | * | 12/1954 | Day | 474/38 |
| 2,703,986 A | * | 3/1955 | McClelland | 474/43 |
| 2,722,131 A | * | 11/1955 | Chankalian et al. | 474/27 |
| 2,776,575 A | * | 1/1957 | Michie | 474/46 |
| 2,846,894 A | * | 8/1958 | Mas | 474/42 |
| 2,894,405 A | * | 7/1959 | Carle | 474/25 |
| 2,933,952 A | * | 4/1960 | Schou | 475/211 |
| 2,944,433 A | * | 7/1960 | Myers | 474/40 |
| 2,962,910 A | * | 12/1960 | Wolfram | 474/13 |
| 2,976,745 A | * | 3/1961 | Bade | 74/606 R |
| 3,015,237 A | * | 1/1962 | Musgrave | 474/33 |
| 3,048,056 A | * | 8/1962 | Wolfram | 74/665 R |
| 3,117,461 A | * | 1/1964 | Fermier | 474/39 |
| 3,140,620 A | * | 7/1964 | Ferara | 474/86 |
| 3,150,527 A | * | 9/1964 | Trandel | 474/40 |
| 3,156,127 A | * | 11/1964 | Pettigrew | 474/44 |
| 3,175,409 A | * | 3/1965 | Macy | 474/144 |
| 3,193,087 A | * | 7/1965 | Hahn | 198/834 |
| 3,245,274 A | * | 4/1966 | Firth et al. | 474/37 |
| 3,365,967 A | * | 1/1968 | Moogk | 474/19 |
| 3,383,933 A | * | 5/1968 | Shultz et al. | 474/135 |
| 3,386,299 A | * | 6/1968 | Brown et al. | 474/29 |
| 3,430,505 A | * | 3/1969 | Klaus et al. | 474/46 |
| 3,467,177 A | * | 9/1969 | Hoddinott | 165/47 |
| 3,478,610 A | * | 11/1969 | Sakai | 474/43 |
| 3,491,608 A | * | 1/1970 | Trofimov | 474/39 |
| 3,603,296 A | * | 9/1971 | Mitchell | 123/41.46 |
| 4,023,429 A | * | 5/1977 | Davies, III | 474/135 |
| 4,223,771 A | * | 9/1980 | Petersen | 192/224.1 |
| 4,364,735 A | * | 12/1982 | Plamper et al. | 474/14 |
| 4,493,677 A | * | 1/1985 | Ikenoya | 474/93 |
| 4,526,061 A | * | 7/1985 | Sakakibara et al. | 474/28 |
| 4,568,319 A | * | 2/1986 | Samata | 474/148 |
| 4,589,859 A | * | 5/1986 | Kanesaka | 474/148 |
| 4,608,885 A | * | 9/1986 | Koivunen | 475/210 |
| 4,631,977 A | * | 12/1986 | Kawashima | 74/606 A |
| 4,660,438 A | * | 4/1987 | Tatara et al. | 477/41 |
| 4,671,782 A | * | 6/1987 | Ochiai et al. | 474/93 |
| 4,671,783 A | * | 6/1987 | Seymour | 474/148 |
| 4,687,461 A | * | 8/1987 | Palloch et al. | 474/148 |
| 4,697,660 A | * | 10/1987 | Wu et al. | 180/65.25 |
| 4,779,488 A | * | 10/1988 | Takano et al. | 74/745 |
| 4,781,015 A | * | 11/1988 | Dinkelmann et al. | 57/105 |
| 4,820,243 A | * | 4/1989 | Fub | 474/43 |
| 4,896,739 A | * | 1/1990 | Miura et al. | 180/248 |
| 5,006,092 A | * | 4/1991 | Neuman et al. | 474/8 |
| 5,152,255 A | * | 10/1992 | Fukuda | 123/41.33 |
| 5,172,786 A | * | 12/1992 | Ishibashi et al. | 180/190 |
| 5,397,276 A | * | 3/1995 | Chang | 474/148 |
| 5,411,444 A | * | 5/1995 | Nakamura et al. | 474/148 |
| 5,468,192 A | * | 11/1995 | Robbins | 474/28 |
| 5,709,624 A | * | 1/1998 | Donowski | 474/8 |
| 5,752,892 A | * | 5/1998 | Taomo et al. | 474/112 |
| 5,819,868 A | * | 10/1998 | Koike et al. | 180/190 |
| 5,836,843 A | * | 11/1998 | Richards | 474/29 |
| 5,845,618 A | * | 12/1998 | Taue et al. | 123/317 |
| 5,957,230 A | * | 9/1999 | Harano et al. | 180/68.4 |
| 5,967,696 A | * | 10/1999 | Allen et al. | 404/112 |
| 5,976,044 A | * | 11/1999 | Kuyama | 474/93 |
| 6,006,715 A | * | 12/1999 | Izumi et al. | 123/192.2 |
| 6,095,937 A | * | 8/2000 | Aaen | 474/10 |
| 6,186,916 B1 | * | 2/2001 | Blanchard | 474/14 |
| 6,238,312 B1 | * | 5/2001 | Tsubata et al. | 474/144 |
| 6,267,700 B1 | * | 7/2001 | Takayama | 474/93 |
| 6,364,797 B1 | * | 4/2002 | Ikusue et al. | 474/148 |
| 6,398,683 B1 | * | 6/2002 | Fukuda | 474/144 |
| 6,412,617 B1 | * | 7/2002 | Spijker et al. | 192/3.55 |
| 6,463,866 B2 | * | 10/2002 | Huffmeyer | 111/177 |
| 6,481,408 B2 | * | 11/2002 | Tsutsumikoshi | 123/195 R |
| 6,523,627 B2 | * | 2/2003 | Fukuda | 180/68.4 |
| 6,544,134 B2 | * | 4/2003 | Ohyama et al. | 474/144 |
| 6,557,516 B2 | * | 5/2003 | Tsutsumikoshi | 123/196 R |
| 6,591,934 B2 | * | 7/2003 | Tsutsumikoshi | 180/291 |
| 6,672,982 B2 | * | 1/2004 | Ikusue et al. | 474/144 |
| 6,705,961 B2 | * | 3/2004 | Johnson et al. | 474/8 |
| 6,715,460 B2 | * | 4/2004 | Ashida et al. | 123/196 R |
| 6,725,954 B1 | * | 4/2004 | Keane et al. | 180/6.48 |
| 6,808,465 B2 | * | 10/2004 | Kuga et al. | 474/14 |
| 6,848,528 B2 | * | 2/2005 | Pichler et al. | 180/190 |
| 6,896,087 B2 | * | 5/2005 | Korenjak et al. | 180/292 |
| 6,941,918 B2 | * | 9/2005 | Laimboeck | 123/195 R |
| 6,964,317 B2 | * | 11/2005 | Groves et al. | 180/344 |
| 6,971,438 B2 | * | 12/2005 | Oki et al. | 165/41 |
| 7,007,657 B2 | * | 3/2006 | Morii | 123/197.1 |
| 7,093,569 B2 | * | 8/2006 | Nakatsuka et al. | 123/41.44 |
| 7,147,077 B2 | * | 12/2006 | Morii et al. | 180/291 |
| 7,152,706 B2 | * | 12/2006 | Pichler et al. | 180/68.3 |
| 7,163,074 B2 | * | 1/2007 | Inomori et al. | 180/219 |
| 7,201,686 B2 | * | 4/2007 | Masuda et al. | 474/144 |
| 7,235,035 B2 | * | 6/2007 | Korenjak et al. | 477/174 |
| 7,240,758 B2 | * | 7/2007 | Korenjak et al. | 180/292 |
| 7,243,564 B2 | * | 7/2007 | Chonan et al. | 74/329 |
| 7,276,003 B2 | * | 10/2007 | Liao | 474/8 |
| 7,281,596 B2 | * | 10/2007 | Fukuda | 180/68.2 |
| 7,311,623 B2 | * | 12/2007 | Masuda et al. | 474/8 |
| 7,316,626 B2 | * | 1/2008 | Oishi et al. | 474/144 |
| 7,325,527 B2 | * | 2/2008 | Hochmayr et al. | 123/196 R |
| 7,334,556 B2 | * | 2/2008 | Wachigai et al. | 123/195 HC |
| 7,363,999 B2 | * | 4/2008 | Hastings | 180/220 |
| 7,377,351 B2 | * | 5/2008 | Smith et al. | 180/233 |
| 7,398,753 B2 | * | 7/2008 | Masuda et al. | 123/192.2 |
| 7,401,589 B2 | * | 7/2008 | Oishi et al. | 123/196 R |
| 7,427,248 B2 | * | 9/2008 | Chonan | 474/93 |
| 7,591,241 B2 | * | 9/2009 | Ishikawa | 123/195 R |
| 7,617,899 B1 | * | 11/2009 | Warner et al. | 180/190 |
| 7,617,904 B1 | * | 11/2009 | Einboeck et al. | 180/336 |
| 7,625,306 B2 | * | 12/2009 | Sato | 474/80 |
| 7,648,435 B2 | * | 1/2010 | Ishida et al. | 474/8 |
| 7,665,561 B2 | * | 2/2010 | Shiozaki et al. | 180/219 |
| 2001/0024497 A1 | * | 9/2001 | Sugano et al. | 477/2 |
| 2002/0017266 A1 | * | 2/2002 | Tsutsumikoshi | 123/195 R |
| 2002/0026928 A1 | * | 3/2002 | Korenjak et al. | 123/572 |
| 2002/0029916 A1 | * | 3/2002 | Inaoka et al. | 180/218 |
| 2002/0033162 A1 | * | 3/2002 | Tsutsumikoshi | 123/196 R |
| 2002/0033295 A1 | * | 3/2002 | Korenjak et al. | 180/292 |
| 2002/0119846 A1 | * | 8/2002 | Kitai et al. | 474/14 |
| 2004/0031635 A1 | * | 2/2004 | Pichler et al. | 180/190 |
| 2004/0040533 A1 | * | 3/2004 | Laimboeck | 123/197.1 |
| 2004/0250789 A1 | * | 12/2004 | Morii et al. | 123/192.2 |
| 2005/0082101 A1 | * | 4/2005 | Inomori et al. | 180/219 |
| 2005/0103558 A1 | * | 5/2005 | Davis et al. | 180/383 |
| 2005/0119076 A1 | * | 6/2005 | Chonan et al. | 474/29 |
| 2005/0193965 A1 | * | 9/2005 | Nakatsuka et al. | 123/41.44 |
| 2006/0112907 A1 | * | 6/2006 | Nakatsuka et al. | 123/2 |
| 2007/0151789 A1 | * | 7/2007 | Bracy et al. | 180/219 |
| 2008/0053392 A1 | * | 3/2008 | Chiba | 123/184.21 |
| 2008/0060867 A1 | * | 3/2008 | Oda et al. | 180/291 |
| 2008/0108479 A1 | * | 5/2008 | Ishikawa | 477/44 |
| 2008/0121454 A1 | * | 5/2008 | Oishi et al. | 180/219 |
| 2008/0128211 A1 | * | 6/2008 | Mitsubori et al. | 184/6.12 |
| 2008/0178834 A1 | * | 7/2008 | Ishida et al. | 123/196 R |
| 2008/0314687 A1 | * | 12/2008 | Shiozaki et al. | 184/6.5 |

FOREIGN PATENT DOCUMENTS

| | | |
|---|---|---|
| DE | 103 17 691 B4 | 3/2006 |
| EP | 1 460 238 A2 | 9/2004 |
| EP | 1 460 238 B1 | 2/2008 |
| JP | 64-55196 U | 4/1989 |

* cited by examiner

POWER UNIT FOR SMALL VEHICLE

CROSS-REFERENCE TO RELATED APPLICATIONS

The present application claims priority under 35 USC 119 to Japanese Patent Application No. 2006-324988 filed on Nov. 30, 2006 the entire contents thereof is hereby incorporated by reference.

BACKGROUND OF THE INVENTION

1. Field of the Invention

The present invention relates to a power unit for a small vehicle. The unit composed of an internal combustion engine with a crankshaft and a power transmission system. The power transmission system is equipped with a belt-type continuously variable transmission, having a drive shaft and a driven shaft, which are arranged in parallel to the crankshaft. The belt-type continuously variable transmission is disposed below the axis of the crankshaft. The torque from the crankshaft is transmitted to the drive shaft so as to make the crankshaft and the drive shaft rotate in opposite directions. The power transmission system also includes an output shaft, which is linked and interlocked with the driven shaft via a gear transmission system, and which is disposed above the continuously variable transmission.

2. Description of Background Art

Japanese Utility Model Registration Application Publication No. SHO64-55196 discloses a conventionally known example of such a power unit as the one mentioned above. In the power unit of this disclosure, the crankshaft, and the drive and the driven shafts of the belt-type continuously variable transmission are arranged in a triangular shape in a projection drawing on a plane that is orthogonal to these axes, with the crankshaft being positioned at the apex. In addition the output shaft having a gear that meshes with another gear provided on the driven shaft is disposed adjacent to the driven shaft.

In the power unit disclosed in Japanese Utility Model Registration Application Publication No. SHO64-55196, the driving power is transmitted from the crankshaft to the output shaft via the drive and the driven shafts of the belt-type continuously variable transmission. The crankshaft and the output shaft rotate in the same rotational direction. When a gear transmission replaces the continuously variable transmission, the driving power is transmitted from the crankshaft to the output shaft via the main and the counter shafts of the gear transmission, and the crankshaft and the output shaft rotate in rotational directions opposite to each other. Accordingly, when the power unit is equipped with a gear transmission instead of a belt-type continuously variable transmission, not only the power transmission system but also other components in the drive train from the output shaft of the power unit to the drive wheel have to be changed.

In this respect, a possible solution is to make a gear reduction mechanism that is provided between the driven shaft of the continuously variable transmission and the output shaft be so configured that the driven shaft and the output shaft can rotate in the same rotational direction. In this case, however, it is desirable that the space to dispose the gear reduction mechanism be secured so efficiently that the power unit may be prevented from becoming larger in size.

SUMMARY AND OBJECTS OF THE INVENTION

The present invention is made under such circumstances. An object of an embodiment of the invention is to provide a power unit for a small vehicle in which the drive train from the output shaft to the drive wheel and the power generating portion of the internal combustion engine can also be used even along with a gear transmission that replaces the belt-type continuously variable transmission. At the same time, the power unit to be provided has to be so constructed as to be capable of preventing the power unit from becoming large in size.

To accomplish the above-mentioned object according to an embodiment of the present invention, a power unit for a small vehicle is provided which is a unit composed of an internal combustion engine with a crankshaft and a power transmission system. The power transmission system is equipped with a belt-type continuously variable transmission having a drive shaft and a driven shaft, which are arranged in parallel to the crankshaft. The belt-type continuously variable transmission is disposed below the axis of the crankshaft. The torque from the crankshaft is transmitted to the drive shaft so as to make the crankshaft and the drive shaft rotate in opposite directions. The power transmission system also includes an output shaft, which is linked and interlocked with the driven shaft via a gear transmission system, and which is disposed above the continuously variable transmission. The power unit for a small vehicle has the following characteristics. The gear transmission mechanism includes a single idle shaft, which has an axis parallel to the crankshaft, and which is arranged between the driven shaft and the output shaft. The gear transmission mechanism is provided between the driven shaft and the output shaft so as to make the driven shaft and the output shaft rotate in the same direction.

According to an embodiment of the present invention, the power unit for a small vehicle includes the axis of the crankshaft, the axis of the drive shaft, the axis of the driven shaft, the axis of the idle shaft, and the axis of the output shaft that are arranged on an imaginary line that has a substantial U-shape with its upper side being open in a projection drawing on a plane orthogonal to these axes.

According to an embodiment of the present invention, the power unit for a small vehicle has a balancer disposed at the opposite side of the crankshaft from the output shaft.

According to an embodiment of the invention, the gear transmission mechanism that is provided between the driven shaft of the continuously variable transmission and the output shaft is configured to make the driven shaft and the output shaft rotate in the same direction. As a consequence, even when a gear transmission mechanism replaces the belt-type continuously variable transmission, the drive train from the output shaft to the drive wheel and the power generating portion of the internal combustion engine can be used, without modification, both in the power unit equipped with the belt-type continuously variable transmission and in the power unit equipped with the gear transmission mechanism. In addition, the single idle shaft, which is a component of the gear transmission mechanism, is arranged between the driven shaft and the output shaft, which is disposed above the continuously variable transmission. As a consequence, a space-efficient arrangement of the gear transmission mechanism is accomplished. An increase in the width of the power unit in a direction orthogonal to the axis of the crankshaft is suppressed. As a result, the power unit can be prevented from becoming larger in size. In addition, the continuously variable transmission can be disposed even below the crankshaft, the idle shaft, and the output shaft. As a consequence, the power unit can be structured with a mass center located in a lower position.

According to an embodiment of the invention, the crankshaft, the drive shaft, the driven shaft, the idle shaft, and the output shaft have their respective axes arranged in a substantial U-shape with its upper side being open. As a consequence, an increase in the width of the power unit in a direction orthogonal to the axis of the crankshaft is suppressed. As a result, the power unit can be prevented from becoming larger in size.

According to an embodiment of the invention, the power unit for a small vehicle has a balancer disposed at the opposite side of the crankshaft from the output shaft. As a consequence, a space-efficient arrangement of the balancer can be accomplished.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, a mode for carrying out the present invention will be described using an embodiment of the present invention illustrated in accompanying drawings.

Figure 1:
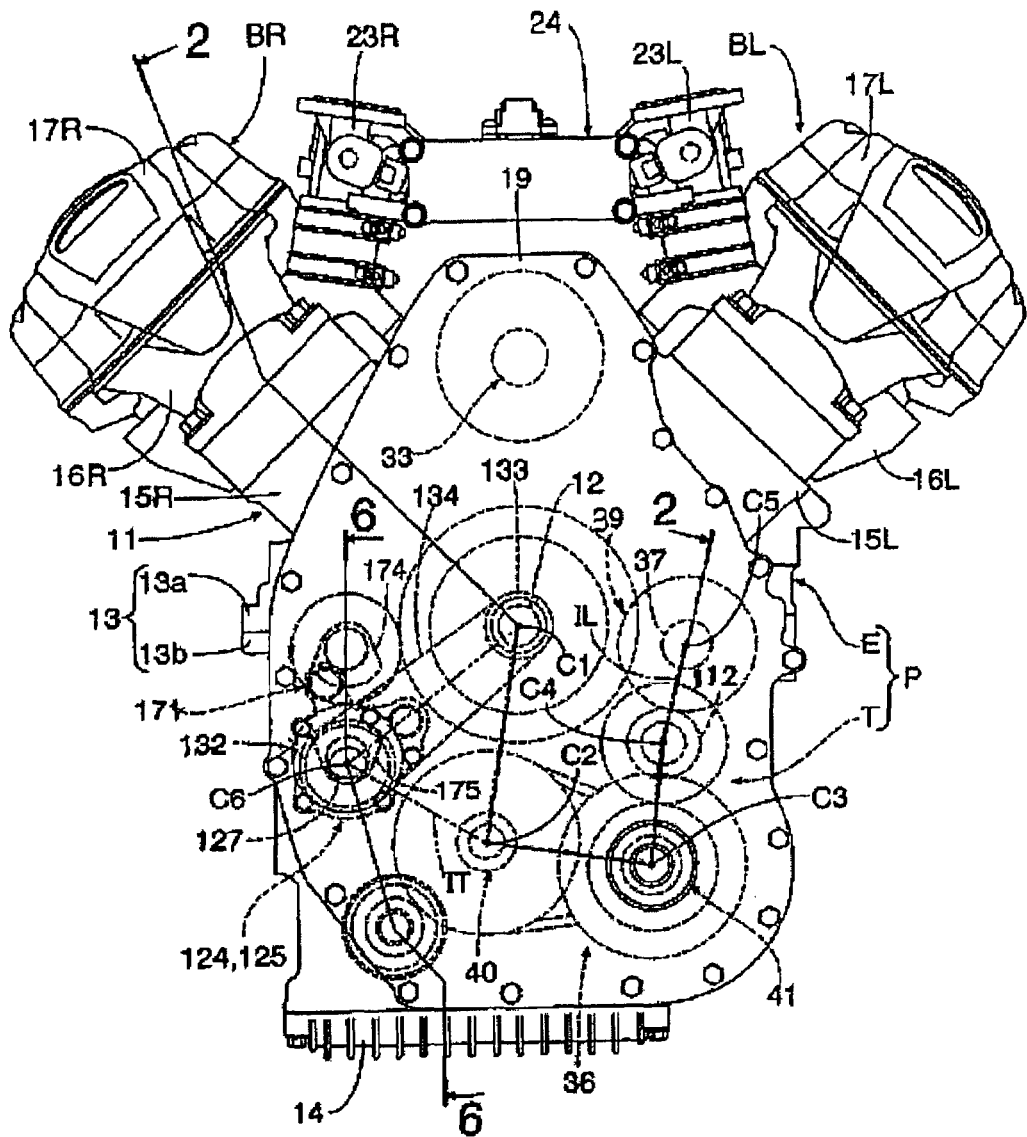
FIG. 1 is a front side view of a power unit.

Referring to FIG. 1, a power unit P is mounted on a small saddle-ride type vehicle, such as a motorcycle, a motor tricycle or an all terrain vehicle. The power unit P includes a V-type four-cylinder internal combustion engine E and a power transmission system T. The power transmission system T transmits, as reducing the speed of, the driving power generated in the internal combustion engine E to a rear wheel (not illustrated), which is a drive wheel.

Figure 2:
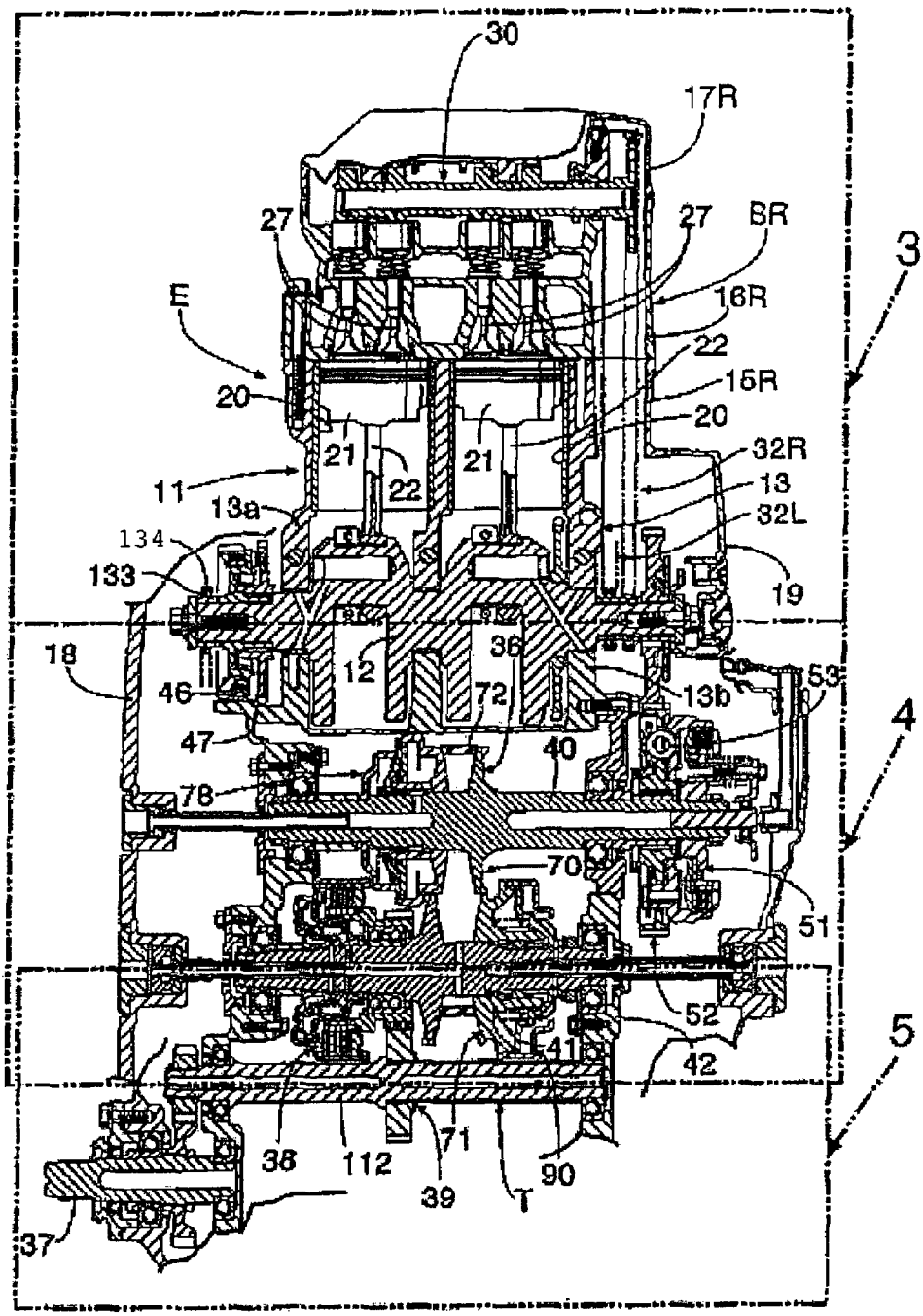
FIG. 2 is a cross-sectional view taken along the line 2-2 in FIG. 1.

Referring to FIG. 2, an engine body 11 of the internal combustion engine E includes a crankcase 13, which rotatably supports a crankshaft 12 extending in the front-to-rear direction of the vehicle. The engine body 11 also includes a right-side and a left-side banks BR, BL, which are respectively formed, into a V-shape, contiguously on the right-side and the left-side upper portions of the crankcase 13 when viewed towards the front in the traveling direction of the vehicle. The engine body 11 also includes an oil pan 14, joined to the bottom of the crankcase 13.

The crankcase 13 is formed by joining an upper case-half 13a and a lower case-half 13b to each other. The crankshaft 12 is rotatably supported between the joint surfaces respectively of the upper case-half 13a and the lower case-half 13b.

The right-side bank BR includes a right-side cylinder block 15R formed integrally with the upper case-half 13a. Also included are a right-side cylinder head 16R joined to the right-side cylinder block 15R, and a right-side head cover 17R joined to the right-side cylinder head 16R. The left-side bank BL, on the other hand, includes a left-side cylinder block 15L formed integrally with the upper case-half 13a. Also included are a left-side cylinder head 16L joined to the left-side cylinder block 15L, and a left-side head cover 17L joined to the left-side cylinder head 16L.

A rear cover 18 covers the lower portion of the engine body 11 from the rear in the traveling direction of the vehicle while a front cover 19 covers the lower portion of the engine body 11 from the front in the traveling direction. The rear cover 18 is joined to the right-side cylinder block 15R, the left-side cylinder block 15L, and a crankcase 13. Meanwhile, the upper portion of the front cover 19, which extends out to reach the lower portion between the right-side and of the left-side banks BR, BL, is joined to the right-side cylinder block 15R, the left-side cylinder block 15L, and a crankcase 13.

Figure 3:
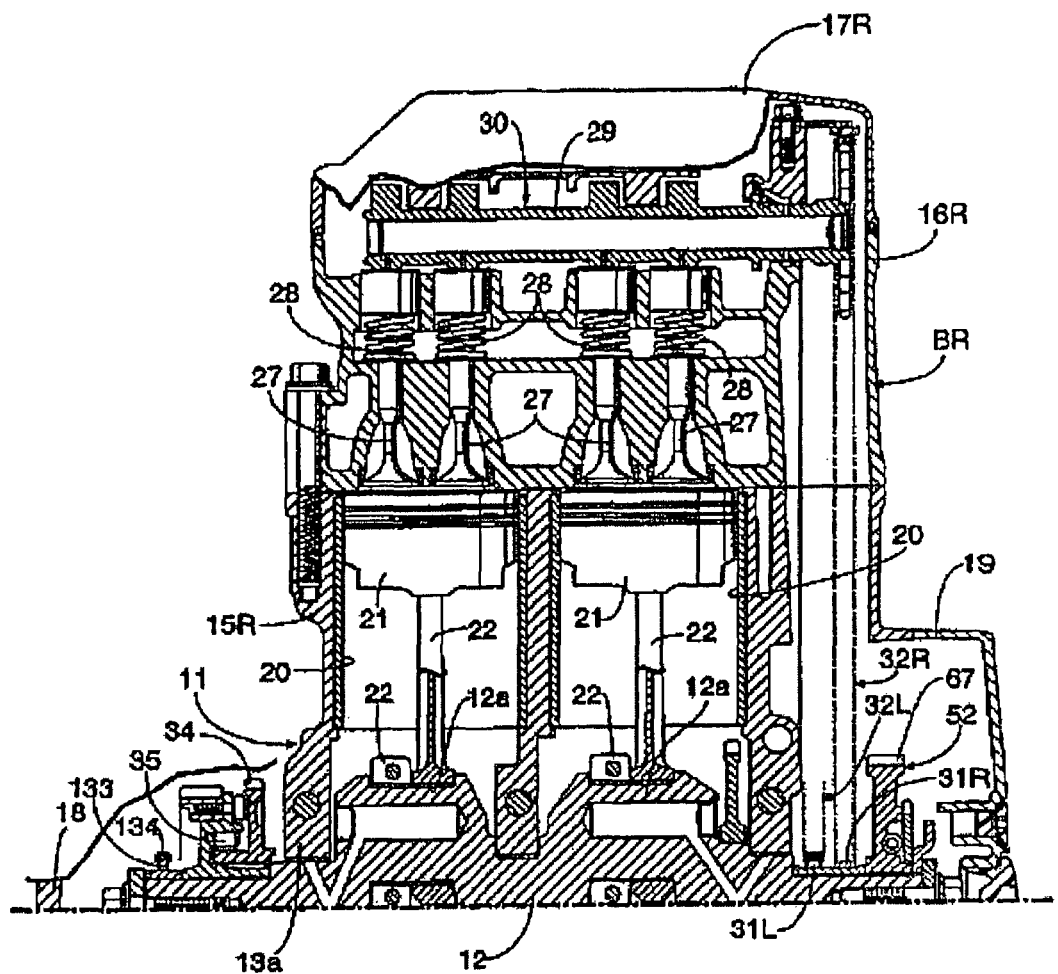
FIG. 3 is an enlarged view of a part indicated by the arrow 3 in FIG. 2.

Referring to FIG. 3, a pair of cylinder bores 20, 20 are formed in each of the right-side and the left-side cylinder blocks 15R and 15L. The pairs of the cylinder bores 20, 20 are offset from each other in the axial direction of the crankshaft 12. Pistons 21, 21 are slidably fitted into respective cylinder bores 20, 20 and are connected, with respective connecting rods 22, 22 to respective crank pins 12a, 12a.

As FIG. 1 shows, an intake system 24 is disposed between the two banks BR, BL, and includes throttle bodies 23R and 23L. The throttle bodies 23R are joined to the right-side cylinder head 16R, and correspond individually to the cylinders of the right-side bank BR. The throttle bodies 23L are joined to the left-side cylinder head 16L, and correspond individually to the cylinders of the left-side bank BL.

Intake valves 27, 27 are disposed in the right-side and the left-side cylinder heads 16R and 16L so as to control the flow rate of the air-fuel mixture supplied from the intake system 24. A pair of the intake valves 27, 27 are disposed for each cylinder so as to be capable of being opened and closed. Valve springs 28, 28 are provided to bias the respective intake valves 27, 27 to a direction such as to close the intake valves 27, 27. Exhaust valves (not illustrated) are also disposed in the right-side and the left-side cylinder heads 16R and 16L so as to control the flow rate of the exhaust gas. A pair of the exhaust valves, which are capable of being opened and closed, are disposed for each cylinder, and are biased to a direction such as to close the valves. Intake valves 27 and exhaust valves are opened and closed by respective valve systems 30, which include intake-side cam shafts 29 and exhaust-side cam shafts (not illustrated). The intake-side cam shafts 29 correspond to the intake valves while the exhaust side cam shafts correspond to the exhaust valves.

In a state where the power unit P is mounted on the vehicle, a first end of the crankshaft 12 sticks out frontward from the crankcase 13. A synchronizing transmission means 32R, including a drive sprocket 31R fixed onto the crankshaft 12, is provided between the portion of the crankshaft 12, which portion sticks out forward from the crankcase 13, and each one of the intake-side cam shaft 29 and the exhaust-side cam shaft of each valve system 30 in the right-side bank BR. A synchronizing transmission means 32L is provided between the crankshaft 12 and each one of the intake-side cam shafts 29 and of the exhaust side cam shafts of each valve system 30 of the left-side bank BL. These synchronizing transmission means 32R, 32L respectively transmit the torque from the crankshaft 12 to the intake-side cam shafts 29 and to the exhaust-side cam shafts while the speed of the transmitted torque is reduced by half.

In a state where the power unit P is mounted on the vehicle, a second end of the crankshaft 12 sticks out rearwardly from the crankcase 13. A driven gear 34 is fitted onto the second end portion of the crankshaft 12 so as to rotate relative to the crankshaft 12. A starter motor 33 is attached to the upper case-half 13a of the crankcase, precisely, at a position that is covered with the front cover 19 from the front side (see FIG. 1). Driving power is transmitted from the starter motor 33 to the driven gear 34 via an unillustrated gear mechanism. A unidirectional clutch is provided between the driven gear 34 and the crankshaft 12 so as to allow the transmission of the driving power from the driven gear 34 to the side of the crankshaft 12.

Figure 4:
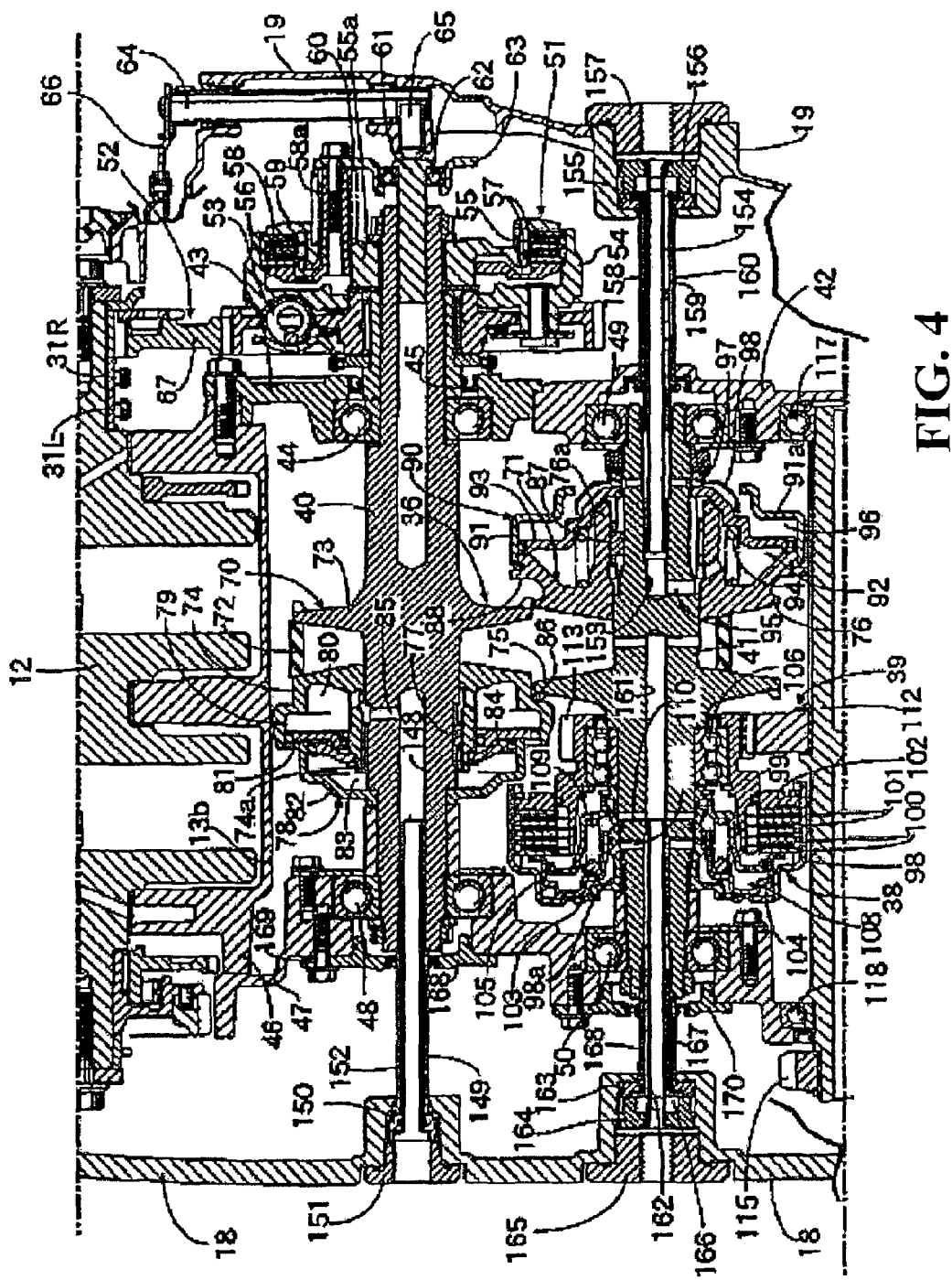
FIG. 4 is an enlarged view of a part indicated by the arrow 4 in FIG. 2.
Figure 5:
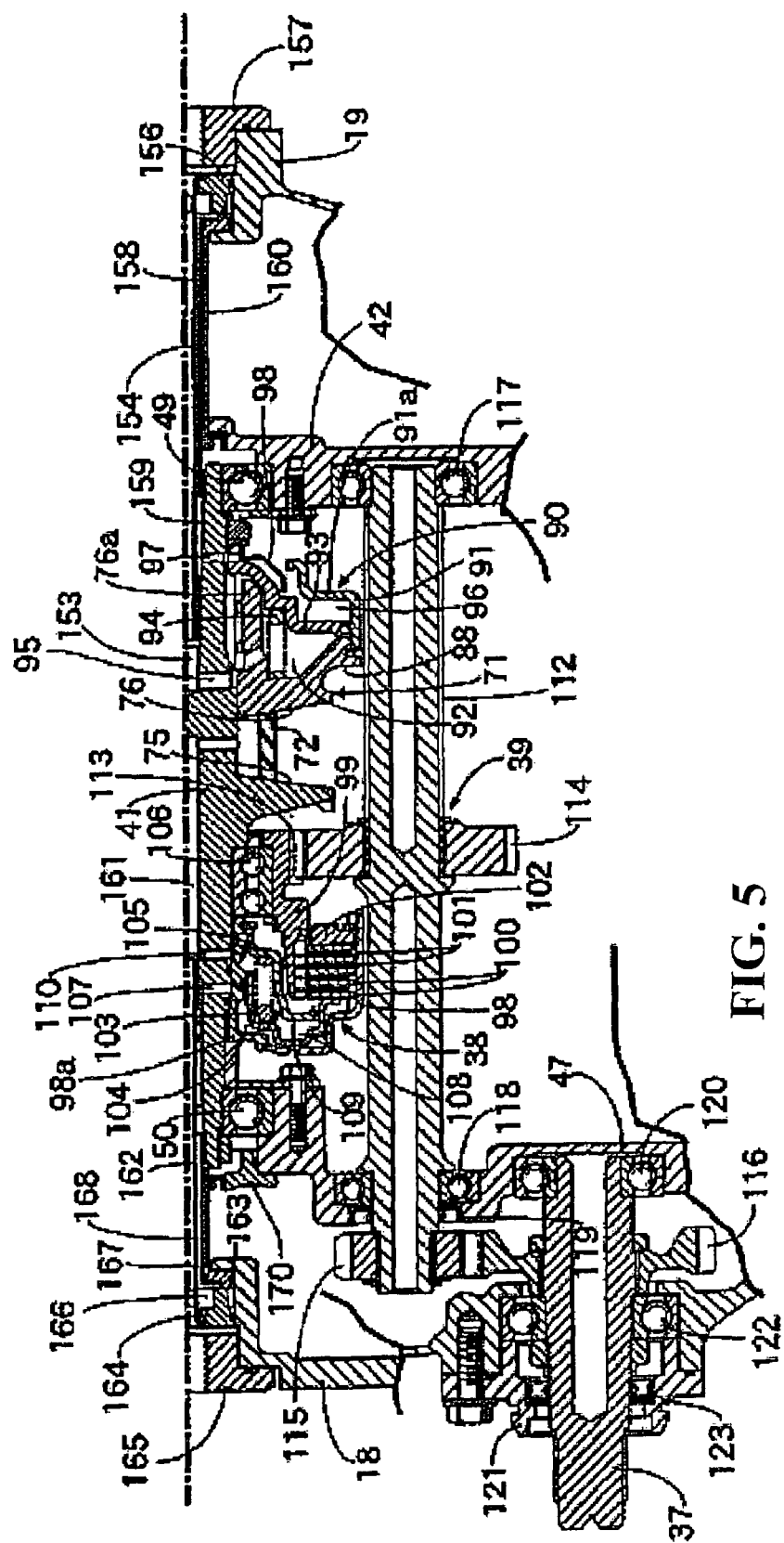
FIG. 5 is an enlarged view of a part indicated by the arrow 5 in FIG. 2.

Referring to FIGS. 4 and 5, the power transmission system T includes a belt-type continuously variable transmission 36, which accomplishes stepless changes in the speed of the driving power by use of hydraulic control. The power transmission system T also includes an output shaft 37, which sticks out rearwardly from the rear cover 18 so as to transmit the driving power to the drive wheel of the vehicle. Also included in the power transmission system T are a hydraulic clutch 38 and a gear transmission mechanism 39, which are provided between the continuously variable transmission 36 and the output shaft 37.

The continuously variable transmission 36 includes a drive shaft 40 and a driven shaft 41, which are parallel to the crankshaft 12, and which are placed below the axis of the crankshaft 12. A first end of the drive shaft 40 rotatably penetrates a front support-wall 43 fixed to the front side-wall 42 of the lower case-half 13b of the crankcase 13. A ball bearing 44 and an oil seal 45, which is placed at an outer position than the ball bearing 44, are set between the front support-wall 43 and the drive shaft 40. A second end of the drive shaft 40, on the other hand, is rotatably supported by a rear support-wall 47 fixed to a rear side-wall 46 of the lower case-half 13b of the crankcase 13. A ball bearing 48 is set between the rear support-wall 47 and the second end of the drive shaft 40.

A first end of the driven shaft 41 is rotatably supported by the front side-wall 42 of the lower case-half of the crankcase 13 with a ball bearing 49 set in between. A second end of the driven shaft 41 is rotatably supported by the rear support-wall 47 with a ball bearing 50 set in between.

A starter clutch 51 is put onto a shaft end of a first-end side of the drive shaft 40, which shaft end sticks out from the front support-wall 43. The starter clutch 51 includes a clutch outer 54 and a clutch inner 55. The driving power is transmitted from the crankshaft 12 via a primary reduction-gear mechanism 52 and a damper spring 53 to the clutch outer 54. The clutch inner 55 has a boss portion 55a. The boss portion 55a is placed in the center portion inside the clutch outer 54, and is coupled onto the drive shaft 40 so as not to rotate relative to the drive shaft 40. The starter clutch 51 also includes a plurality of first drive clutch plates 56 and a plurality of first driven clutch plates 57. The plurality of first drive clutch plates 56 are splined to fit into the inner circumferential wall of the clutch outer 54, and are slidable in the axial direction. The plurality of first driven clutch plates 57 are splined to fit onto the outer circumferential wall of the clutch inner 55, and are slidable in the axial direction. The first drive and the first driven clutch plates 56 and 57 are stacked alternately with each other. In addition, the starter clutch 51 includes a pressure plate 58, a pressure receiving plate 59, and a clutch spring 60. The pressure plate 58 is slidably supported by the boss portion 55a so as to face, from the inside, the first drive and the first driven clutch plates 56 and 57 which are stacked alternately with each other. The pressure receiving plate 59 is formed integrally with the clutch inner 55 so as to face, from the outside, the first drive and the first driven clutch plates 56 and 57 which are stacked alternately with each other. The clutch spring 60 biases the pressure plate 58 to the pressure-receiving-plate 59 side.

A linking shaft 58a is provided to the pressure plate 58. The linking shaft 58a extends in a direction along the axis of the drive shaft 40, and penetrates the clutch inner 55 so as to move freely. A slide shaft 61 is coaxially and slidably fitted into a first end portion of the drive shaft 40. A release member 63 is supported by the slide shaft 61 with a release bearing 62 set in between. The linking shaft 58a is fixed to the release member 63, and the clutch spring 60 is set, as being compressed, between the clutch inner 55 and the release member 63.

An operation shaft 64 is rotatably supported by the front cover 19, and switches the state of the starter clutch 51 between connected and disconnected states. The front cover also holds a push rod 65, which is slidable and determines the position of the release member 62 in accordance with the rotational movement of the operation shaft 64. An end portion of the operation shaft 64 sticks out from the front cover 19, and a clutch lever 66 is provided to the sticking-out end portion.

An operation on the clutch lever 66 pushes the push rod 65, and thus the pressure plate 58 is moved backward against the spring force of the clutch spring 60. Consequently, the first drive clutch plates 56 and the first driven clutch plates 57 are in a released state. Accordingly, the starter clutch 51 is in the clutch-off state with the clutch outer 54 and the clutch inner 55 being disconnected from each other.

To the first end side of the drive shaft 40, the torque from the crankshaft 12 is transmitted via the primary reduction-gear mechanism 52, the damper spring 53 and the starter clutch 51. The first reduction-gear mechanism 52, which transmits the torque from the crankshaft 12 to the drive-shaft 40 side while reducing the speed of the torque, includes a primary drive gear 67 provided on the crankshaft 12, a primary driven gear 68, which meshes with the primary drive gear 67. As illustrated in FIG. 3, the primary drive gear 67 is provided on the crankshaft 12 at the outer side of the drive sprocket 31R. The primary driven gear 68 is supported by the drive shaft 40 so as to rotate relative to the drive shaft 40, and is connected to the clutch outer 54 of the starter clutch 51 with the damper spring 53 set in between.

The continuously variable transmission 36 includes a drive pulley 70 provided on the drive shaft 40, a driven pulley 71 provided on the driven shaft 41, and an endless V-belt 72, which is looped between the drive and the driven pulleys 70 and 71. The drive pulley 70 is composed of a drive-side fixed pulley-half 73, which is formed integrally with the drive shaft 40, and a drive-side movable pulley-half 74, which is opposed to the drive-side fixed pulley-half 73. The drive-side movable pulley-half 74, which is supported by the drive shaft 40, is not rotatable relative to the drive shaft 40, but is slidable in the axial direction. The driven pulley 71 is composed of a driven-side fixed pulley-half 75, which is formed integrally with the driven shaft 41, and a driven-side movable pulley-half 76, which is opposed to the driven-side fixed pulley-half 75. The driven-side movable pulley-half 76, which is supported by the driven shaft 40, is not rotatable relative to the driven shaft 41, but is slidable in the axial direction.

The V-belt 72 is looped between the drive and the driven pulleys 70 and 71. The relative positions of the drive-side and the driven-side movable pulley-halves 74, 76 respectively to the drive-side and the driven-side movable pulley-halves 73, 75 are hydraulically controlled to change the effective diameters with which the V-belt actually wraps around each of the drive and the driven pulleys 70 and 71. Accordingly, the speed of the drive power transmitted from the drive shaft 40 to the driven shaft 41 is steplessly changed.

The drive-side movable pulley-half 74 is arranged at a position opposed to the drive-side fixed pulley-half 73 from a side opposite to the side where the front support-wall 43 is located. A first boss portion 74a is formed integrally with and contiguously to the inner circumferential portion of the drive-side movable pulley-half 74, and coaxially surrounds the drive shaft 40. A key 77 is set between the first boss portion 74a and the drive shaft 40. A drive-side hydraulic drive mechanism 78 for slidingly driving the drive-side movable pulley-half 74, is disposed on the drive shaft 40 at the opposite side of the drive-side movable pulley-half 74 from the drive-side fixed pulley half 73.

The drive-side hydraulic drive mechanism 78 includes a first case member 79, a first end plate 81, a fixed cup-shaped body 82, and a second end plate 84. The cylindrical first case member 79, which surrounds coaxially the first boss portion 74a, is formed integrally with and contiguously to the outer circumferential portion of the drive-side movable pulley-half 74, and extends to the opposite side from the drive-side fixed pulley-half 73. The ring-plate-shaped first end plate 81 is slidingly in contact liquid-tightly with the inner circumference of the first case portion 79 and the outer circumference of the first boss portion 74a. Accordingly a first hydraulic chamber 80 is formed between the first end plate 81 and the drive-side movable pulley-half 74. The fixed cup-shaped body 82 is fixed on the drive shaft 40 at the opposite side of the drive-side movable pulley-half 74 from the drive-side fixed pulley-half 73. The leading end portion of the fixed cup-shaped body 82 is brought into contact with the first end plate 81. The second end plate 84 is slidingly in contact liquid-tightly with the inner circumference of the fixed cup-shaped body 82. The inner circumference portion of the second end plate 84 is fixed to the first boss portion 74a. Accordingly, a second hydraulic chamber 83 is formed between the second end plate 84 and the fixed cup-shaped body 82.

In addition, a first oil hole 85, which communicates with the first and the second hydraulic chambers 80, 83, is formed in the drive shaft 40. The drive-side movable pulley-half 74 is biased by a hydraulic force corresponding to the hydraulic pressure applied to the first and the second hydraulic chambers 80, 83. The drive-side movable pulley-half 74 is biased to a side as approaching the drive-side fixed pulley-half 73 so as to accomplish a larger effective diameter with which the V-belt 72 is wrapped around the drive pulley 70.

The driven-side fixed pulley-half 75 is formed integrally with the driven shaft 41 at a position corresponding to the drive-side movable pulley-half 74 of the drive pulley 70. When viewed from a direction parallel to the axes of the drive and the driven shafts 40 and 41, the drive-side movable pulley-half 74 and the driven-side fixed pulley-half 75 are arranged as partially overlapping each other. A run-off concave portion 86 is formed in the outer circumference of the driven-side movable pulley half 74 to prevent the drive-side movable pulley-half 74 and the driven-side fixed pulley-half 75 from interfering with each other.

The driven-side movable pulley-half 76 is arranged at a position corresponding to the drive-side fixed pulley-half 73 of the drive pulley 70. A second boss portion 76a is formed, as coaxially surrounding the driven shaft 41, integrally with and contiguously to the inner circumferential portion of the driven-side movable pulley-half 76. The second boss portion 76a extends to the side opposite from the side where the driven-side fixed pulley-half 75 is located. A key 87 is set between the second boss portion 76a and the driven shaft 41. When viewed from a direction parallel to the axes of the drive and the driven shafts 40 and 41, the drive-side fixed pulley-half 73 and the driven-side movable pulley-half 76 are arranged as partially overlapping each other. A run-off concave portion 88 is formed in the outer circumference of the driven-side movable pulley half 76 to prevent the drive-side fixed pulley-half 73 and the driven-side movable pulley-half 76 from interfering with each other.

As described above, the run-off concave portion 86 to prevent the interference between the drive-side movable pulley-half 74 and the driven-side fixed pulley-half 75 is formed in the outer circumference of the drive-side movable pulley-half 74. The run-off concave portion 88 to prevent the interference between the drive-side fixed pulley-half 73 and the driven-side movable pulley-half 76 is formed in the outer circumference of the driven-side movable pulley-half 76. Consequently, the drive and the driven shafts 40 and 41 can be disposed at positions closer to each other. As a result, a compact continuously variable transmission 36 is obtained.

A driven-side hydraulic drive mechanism 90 for slidingly driving the driven-side movable pulley-half 76, is disposed on the driven shaft 41 at the opposite side of the driven-side movable pulley-half 76 from the driven-side fixed pulley half 75. The driven-side hydraulic drive mechanism 90 includes a case member 91, an end-wall member 93, and a coil spring 94. The cylindrical case member 91 coaxially surrounds the second boss portion 76a. The case member 91 has a first end fixed to the outer circumferential portion of the driven-side movable pulley-half 76, and extends to a side opposite to the side where the driven-side fixed pulley-half 75 is located. The end-wall member 93 is slidingly in contact liquid-tightly with the inner circumference of the case member 91. Accordingly, a third hydraulic chamber 92 is formed between the end-wall member 93 and the driven-side movable pulley-half 76. The inner circumferential portion of the end-wall member 93 is fixed to the driven shaft 41. The coil spring 94 is set, as being compressed, between the driven-side movable pulley-half 76 and the end-wall member 93 so as to prevent the loosening of the V-belt 72, which may possibly occur when the internal combustion engine E is stopped.

In addition, a second oil hole 95, which communicates with the third hydraulic chamber 92, is formed in the driven shaft 41. The driven-side movable pulley-half 76 is biased by a hydraulic force corresponding to the hydraulic pressure applied to the third hydraulic chamber 92. The drive-side movable pulley-half 76 is biased to a side as approaching the driven-side fixed pulley-half 75 so as to accomplish a larger effective diameter with which the V-belt 72 is wrapped around the driven pulley 71. A restriction plate member 91a is formed integrally with and contiguously to a second end of the case member 91 so as to stick out inwardly in the radial direction. The restriction plate member 91a, which is brought into contact with the end-wall member 93 from the opposite side of the end-wall member 93 from the driven-side fixed pulley-half 75, determines the limit to which the driven-side movable pulley-half 76 can get close to the driven-side fixed pulley-half 75.

An annular first canceller chamber 96 is formed between the end-wall member 93 and the restriction plate member 91a, and has an open inner circumference side. A first lubricant-oil passage 97 is formed in the driven shaft 41 and the end-wall member 93 so as to guide the lubricant oil. A guide member 89 is fixed to the end-wall member 93 to guide the lubricant oil from the first lubricant-oil passage 97 to the first-canceller-chamber 96 side. When a centrifugal force acts on the oil of the third hydraulic chamber 92 with its pressure being lowered due to the rotation, a force to press the driven-side movable pulley-half 76 is generated. Even with the generation of such a pressing force, another centrifugal force that similarly acts on the oil in the first canceller chamber 96 prevents the driven-side movable pulley 76 from moving, undesirably, to a side so as to get closer to the driven-side fixed pulley-half 75.

The hydraulic clutch 38 is put onto the driven shaft 41 between the driven pulley 71 and the rear support-wall 47 within the continuously variable transmission 36. The hydraulic clutch 38 includes a clutch outer 98 and a clutch inner 99. The clutch outer 98 includes a cylindrical third boss portion 98a, which is joined to the driven shaft 41 so as not to rotate relative to the driven shaft 41. The clutch inner 99 is coaxially surrounded by the clutch outer 98, and is supported by the driven shaft 41 with a ball bearing 106 set in between so as to freely rotate relative to the driven shaft 41. The hydraulic clutch 38 also includes a plurality of second drive clutch plates 100 and a plurality of second driven clutch plates 101. The plurality of second drive clutch plates 100 are engaged with the clutch outer 98 so as not to rotate relative to the clutch outer 98. The plurality of second driven clutch plates 101 are engaged with the clutch inner 99, so as not to rotate relative to the clutch inner 99. The second drive and the second driven clutch plates 100, 101 are stacked alternately with each other. In addition, the hydraulic clutch 38 includes a pressure receiving plate 102, a piston 103 and a spring 105. The pressure receiving plate 102 is fixedly supported by the clutch outer 98 and faces the second drive and the second driven clutch plates 100, 101, which are stacked alternately with each other. The second drive and the second driven clutch plates 100, 101 are pressured between the pressure receiving plate 102 and the piston 103. A fourth hydraulic chamber 104 is formed between the clutch outer 98 and the piston 103. The spring 105 biases the piston 103 so as to reduce the volume of the fourth hydraulic chamber 104.

The outer circumferential portion and the inner circumferential portion of the piston 103 are slidingly in contact liquid-tightly with the clutch outer 98. In addition, a fourth oil hole 107 is formed in the driven shaft 41, and communicates to the fourth hydraulic chamber 104. An increase in hydraulic pressure in the fourth hydraulic chamber 104 causes the piston 103 to operate so as to pressure the second drive and the second driven clutch plates 100, 101 between the piston 103 and the pressure receiving plate 102. Thus, the hydraulic clutch 38 is in a connected state, in which the torque transmitted from the driven shaft 41 to the clutch outer 98 is further transmitted to the clutch inner 99.

A second canceller chamber 108 is formed, at the opposite side of the piston 103 from the fourth hydraulic chamber 104, between the second canceller chamber 108 and a wall member 109. The inner circumferential portion of the wall member 109 is fixed to the boss portion 98a of the clutch outer 98. The piston 103 is slidingly in liquid-tightly contact with the outer circumferential portion of the wall member 109. In addition, the spring 105 is housed in the second canceller chamber 108, and set between the piston 103 and the wall member 109. Moreover, a second lubricant-oil passage 110 is formed in the third boss portion 98a of the clutch outer 98 and the wall member 109 so as to guide the lubricant oil. When a centrifugal force acts on the oil of the fourth hydraulic chamber 104 with its pressure being lowered due to the rotation, a force to press the piston 103 is generated. Even with generation of such a pressing force, another centrifugal force that similarly acts on the oil in the second canceller chamber 108 prevents the piston 103 from moving, undesirably, to a side so as to press the second drive and the second driven clutch plates 100, 101 between the piston 103 and the pressure-receiving plate 102.

The gear transmission mechanism 39 includes a single idle shaft 112, which has an axis parallel to the crankshaft 12, and which is arranged between the driven shaft 41 and the output shaft 37. The gear transmission mechanism 39 also includes a first gear 113, a second gear 114, a third gear 115, and a fourth gear 116. The first gear 113 is formed integrally with the clutch inner 99 of the hydraulic clutch 38. The second gear 114 meshes with the first gear 113 and is fixed on the idle shaft 112. The third gear 115 is also fixed on the idle shaft 112. The fourth gear 116 meshes with the third gear 115. The fourth gear 116 is fixed on the output shaft 37. The gear transmission mechanism 39 is provided between the driven shaft 41 and the output shaft 37 so as to make the driven shaft 41 and the output shaft 37 rotate in the same direction.

A first end portion of the idle shaft 112 is rotatably supported by the front support-wall 43 with a ball bearing 117 set in between. A second end portion of the idle shaft 112 rotatably penetrates the rear support-wall 47. A ball bearing 118 and an oil seal 119 that is placed at the outer side of the ball bearing 118 are set between the rear support-wall 47 and the idle shaft 112.

A first end of the output shaft 37 is rotatably supported by the rear support-wall 47 with a ball bearing 120. A second end of the output shaft 37 rotatably penetrates the rear cover 18 and a cap 121, which is fastened to the rear cover 18 from the outer side of the rear cover 18. A ball bearing 122 is set between the rear cover 18 and the output shaft 37. An oil seal 123 is set between the cap and the output shaft 37. The third gear 115 is arranged between the rear support-wall 47 and the rear cover 18, and is fixed on the second end portion of the idle shaft 112. The fourth gear 116 is fixed on the output shaft 37 between the rear support wall 47 and the rear cover 18.

Figure 6:
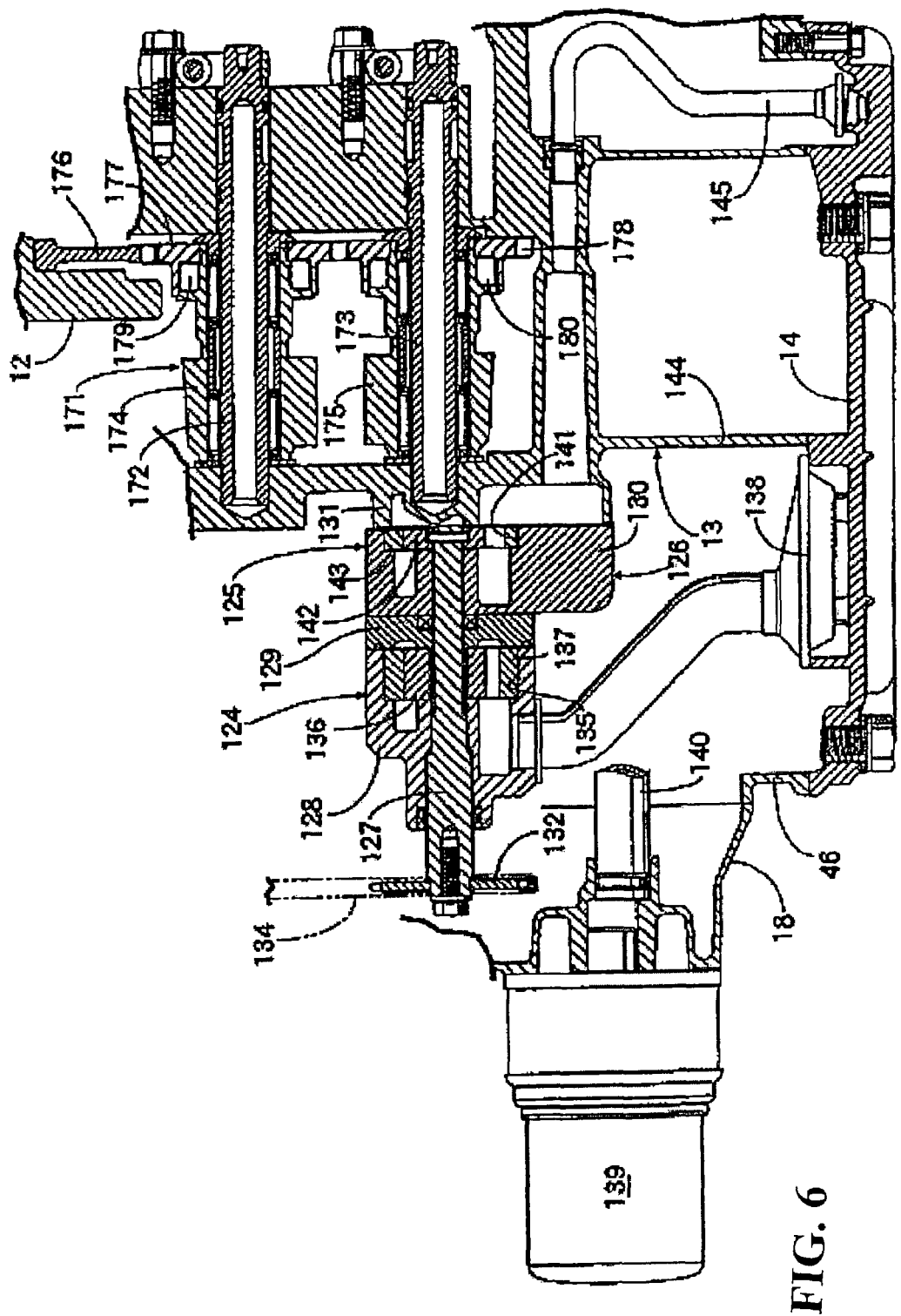
FIG. 6 is an enlarged cross-sectional view taken along the line 6-6 in FIG. 1.

Referring to FIG. 6, lubricant oil ejected from a first oil pump 124 is supplied to every part of the power unit P that needs to be lubricated. The oil ejected from a second oil pump 125 is used for the purpose of at least the control of the gear shifting by, and the lubrication of, the continuously variable transmission 36. In this embodiment, the oil from the second oil pump 125 is used for both purposes. The first and the second oil pumps 124 and 125 share a common pump case 126 and a pump shaft 127, and are arranged adjacent to each other in the axial direction between the rear cover 18 and the crankcase 13.

The pump case 126 is composed of a first, a second, and a third case members 128, 129, and 130, which are stacked in the axial direction and are fastened to a case portion 131 formed in the crankcase 13. The pump shaft 127 rotatably penetrates the first to the third case members 128 to 130, and is rotatably supported by the pump case 126. An end portion of the pump shaft 127 sticks out from the first case member 128, and a driven sprocket 132 is fixed on the end portion. An endless chain 134 is looped between the driven sprocket 132 and a drive sprocket 133, which is fixed on the second end portion of the crankshaft 12. The torque from the crankshaft 12 is transmitted to the pump shaft 127 via the drive sprocket 133, the chain 134 and the driven sprocket 132.

The first oil pump 124 is a trochoid-type pump, and includes a first pump chamber 135 formed between the first and the second case members 128 and 129. An inner rotor 136 fixed on the pump shaft 127 and an outer rotor 137, which meshes with the inner rotor 136, are housed in the first pump chamber 135. Oil is pumped up from the oil pan 14, passes through an oil strainer 138, and then reaches to the first pump chamber 135. The oil then passes through a tubular passage member 140, and is supplied to the oil filter 139 attached to the rear cover 18. The oil from the oil filter 139 is supplied to lubricate every part of the power unit P that needs to be lubricated.

The second oil pump 125 is a trochoid-type pump, and includes a second pump chamber 141 formed between the third case member 130 and the case portion 131. An inner rotor 142 fixed on the pump shaft 127 and an outer rotor 143, which meshes with the inner rotor 142, are housed in the second pump chamber 141. In the crankcase 13, a bulkhead 144 is formed to separately pool the lubricant oil pumped up by the first oil pump 124 and the oil, which is different from the above-mentioned lubricant oil, for hydraulically controlling and lubricating the continuously variable transmission 36. The second oil pump 125 pumps up the oil for the hydraulic control and the lubrication from the oil pan 14 through the suction pipe 145.

The hydraulic pressure of the oil that the second oil pump 125 is subjected to the control performed by hydraulic pressure control valves (not illustrated), which correspond individually to the drive-side hydraulic drive mechanism 78 and the driven-side hydraulic drive mechanism 90. The oil thus controlled is supplied to the first and the second hydraulic chambers 80 and 83 in the drive-side hydraulic drive mechanism 78 and to the third hydraulic chamber 92 in the driven-side hydraulic drive mechanism 90. In addition, the oil is supplied to every part of the continuously variable transmission 36 that needs to be lubricated.

Referring to FIG. 4, a first center oil passage 148 is coaxially formed inside the second end side of the drive shaft 40. The first center oil passage 148 has a closed end on the inner side, and communicates to the first oil hole 85. A cylindrical first pipe member 149 is liquid-tightly and coaxially inserted into the first center oil passage 148 from the rear-cover 18 side. An annular first pipe support member 150, which is liquid-tightly connected to the first pipe member 149, is liquid-tightly fitted to the rear cover 18 at a position corresponding to the drive shaft 40. At the same position, a first connection member 151 is liquid-tightly screwed into the rear cover 18 so that the first pipe support member 150 can be held by and between the first connection member 151 and the rear cover 18. In addition, a tubular passage (not illustrated), which is connected to the first connection member 151, is connected to the hydraulic control valve corresponding to the drive-side hydraulic drive mechanism 78. A first tubular cover 152 surrounds coaxially the first pipe member 149 has a first end liquid-tightly penetrating a supporting member 169 fastened to the rear support-wall 47 at an outer side of the second end of the drive shaft 40. The second end of the first tubular cover 152 is liquid-tightly joined to the rear cover 18.

Referring to FIGS. 4 and 5, a second center oil passage 153 is coaxially formed inside the first end side of the driven shaft 41, and has a closed end on the inner side. A second pipe member 154, which communicates to the second oil hole 95, is liquid-tightly and coaxially inserted into the second center oil passage 153. A second pipe support member 155 and a third pipe support member 156, which is liquid-tightly connected to the second pipe member 154, are liquid-tightly fitted to the front cover 19 at a position corresponding to the driven shaft 41, so that the second pipe support member 155 is held by and between the third pipe support member 156 and the front cover 19. At the same position, a second connection member 157, which communicates to the second pipe member 158 via the third pipe support member 156, is liquid-tightly screwed into the front cover 19 so that the second and the third pipe support members 155 and 156 can be held by and between the second connection member 157 and the front cover 19.

In addition, a tubular passage (not illustrated), which is connected to the second connection member 157, is connected to the hydraulic control valve corresponding to the driven-side hydraulic drive mechanism 90. A third pipe member 158 coaxially surrounds the second pipe member 154, and is liquid-tightly joined to the second pipe support member 155. The third pipe member 158 is coaxially inserted into the second center oil passage 153 so that an annular first oil passage 159 can be formed between the third and the second pipe members 158 and 154. The first oil passage 159 communicates to the first lubricant oil passage 97, but has no communication to the second oil hole 95. A second tubular cover 160 coaxially surrounds a third tubular member 158, and has its two ends joined respectively to the front side-wall 42 and the front cover 19 of the crankcase 13.

A third center oil passage 161 is coaxially formed inside the second end side of the driven shaft 41, and has a closed end on the inner side. A fourth pipe member 162, which communicates to the second lubricant-oil passage 110, is liquid-tightly and coaxially inserted into the third center oil passage 161. A fourth pipe support member 163 and a fifth pipe support member 164, which is liquid-tightly connected to the fourth pipe member 162, are liquid-tightly fitted to the rear cover 18 at a position corresponding to the driven shaft 41, so that the fourth pipe support member 163 is held by and between the fifth pipe support member 164 and the rear cover 18. At the same position, a third connection member 165, which communicates to the fourth pipe member 162 via the fifth pipe support member 164, is liquid-tightly screwed into the rear cover 18 so that the fourth and the fifth pipe support members 163 and 164 can be held by and between the third connection member 165 and the rear cover 18.

A fifth pipe member 167 coaxially surrounds the fourth pipe member 162, so that an annular oil passage 166 is formed in between. The annular oil passage 166 communicates to the fourth oil hole 107 while having no communication to the second lubricant-oil passage 110. A first end of the fifth pipe member 167 is liquid-tightly inserted into the third center oil passage 161 while a second end of the fifth pipe member 167 is liquid-tightly joined to the fourth pipe support member 163.

A third tubular cover 168 coaxially surrounds the fifth pipe member 167. A first end of the third tubular cover 168 liquid-tightly penetrates a supporting member 170, which is fastened to the rear support-wall 47 at the outer side of the second end of the driven shaft 41. A second end of the third tubular cover 168, on the other hand, is liquid-tightly joined to the rear cover 18.

Referring to FIG. 1, in the drawing, C1 is the axis of the crankshaft 12. C2 and C3 are axes respectively of the drive and the driven shafts 40 and 41 of the continuously variable transmission 36, which are arranged below the crankshaft 12. C4 is the axis of the idle shaft 112, which forms a part of the gear transmission mechanism 39. C5 is the axis of the output shaft 37. These axes C1 to C5 are arranged on an imaginary line IL, which has a substantial U-shape with its upper side being open, in the projection drawing on a plane orthogonal to these axes C1 to C5.

In addition, the drive shaft 40 of the continuously variable transmission 36 is arranged below the crankshaft 12 while the pump shaft 127 of the first and the second pumps 124 and 125 is arranged between the crankshaft 12 and the drive shaft 40 in the vertical direction. The axes C1, C2, and C6 of the crankshaft 12, of the drive shaft 40, and of the pump shaft 127 are arranged respectively at positions of vertices of an imaginary triangle IT in the projection drawing on a plane orthogonal to these axes C1, C2 and C6.

In addition, a balancer 171 is disposed at the opposite side of the crankshaft 12 from the output shaft 37. As illustrated in FIG. 6, the balancer 171 is a two-shaft, secondary balancer. A first and a second balancer shafts 174 and 175 of the balancer 171 are arranged with a space in the vertical direction, and are rotatably supported respectively by a pair of pivot shafts 172 and 173. The first balancer shaft 174 is fitted into a driven gear 177, which meshes with a drive gear 176 fixed on the crankshaft 12, at a fitting portion 179. The second balancer shaft 175 is fitted into a driven gear 178, which meshes with the driven gear 177, at a fitting portion 180. The drive power transmitted from the crankshaft 12 rotates the first and the second balancer shafts 174 and 175.

Some advantageous effects of this embodiment relate to the first oil pump 124 that ejects the lubricant oil for every part of the power unit P that needs to be lubricated, while the second oil pump 125 ejects the oil for at least one of the purposes of controlling the speed change of, and lubricating of, the continuously variable transmission 36 (in this embodiment, for both purposes). In this embodiment, the first and the second oil pumps 124 and 125 share the common pump shaft 127. Consequently, driving the first and the second oil pumps 124 and 125 needs a smaller number of component parts. In addition, the first and the second oil pumps 124 and 125 are arranged adjacent to each other in the axial direction. Consequently, assembling the two pumps 124 and 125 to the power unit P requires a smaller number of man-hours. Arranging the two pumps 124 and 125 is made more efficient so that the power unit P can be made more compact.

The drive shaft 40 of the continuously variable transmission 36, with the axis parallel to the crankshaft 12, is disposed below the crankshaft 12. In addition, the pump shaft 127, with the axis parallel to both the crankshaft 12 and the drive shaft 40, is disposed between the crankshaft 12 and the drive shaft 40 in the vertical direction. Moreover, the axis C1 of the crankshaft 12, the axis C2 of the drive shaft 40, and the axis C6 of the pump shaft 127 are arranged so that each of the axes C1, C2, and C6 are positioned at each of the vertices of the imaginary triangle IT in the projection drawing on the plane that is orthogonal to the axes C1, C2, and C6. Consequently, a space-efficient arrangement of the crankshaft 12, the continuously variable transmission 36, and the two pumps 124 and 125 is accomplished, and the power unit P can be made even more compact. In addition, the mass center of the power unit P can be positioned lower.

In addition, the gear transmission mechanism 39 is disposed between the output shaft 37 and the driven shaft 41 of the continuously variable transmission 36. In the gear transmission mechanism 39, the single idle shaft 112 with the axis parallel to the crankshaft 12 is disposed between the driven shaft 41 and the output shaft 37, so that the driven shaft 41 and the output shaft 37 can rotate in the same rotational direction. Consequently, the power unit P of this embodiment can also be used even when a gear transmission replaces the belt-type continuously variable transmission 36. In so doing, no changes are necessary in the drive train and the power generating portion, that is, the internal combustion engine E.

Moreover, the idle shaft 112 is disposed between the driven shaft 41 and the output shaft 37, which is disposed in an upper portion of the continuously variable transmission 36. Consequently, a space-efficient arrangement of the gear transmission mechanism 39 is accomplished. Thus, the increase in the width of the power unit P in a direction orthogonal to the axis of the crankshaft 12 can be suppressed. Further, the power unit P can be prevented from increasing in size. In addition, the arrangement of the continuously variable transmission 36 below the crankshaft 12, idle shaft 112, and the output shaft 37 allows the power unit P to have lower center of mass.

Moreover, assume that C1 is the axis of the crankshaft 12; C2 and C3, the axes respectively of the drive and the driven shafts 40 and 41 of the continuously variable transmission 36, which is disposed below the crankshaft 12; C4, the axis of the idle shaft 112, which forms a part of the gear transmission mechanism 39; and C5, the axis of the output shaft 37. These axes C1 to C5 are arranged so as to be positioned on the substantially U-shaped imaginary line IL with its upper end being open in the projection drawing on a plane orthogonal to these axes C1 to C5. Consequently, the increase in the width of the power unit P in a direction orthogonal to the axis of the crankshaft 12 can be suppressed. Thus, the power unit P can be prevented from increasing in size.

Furthermore, the balancer 171 is disposed at the opposite side of the crankshaft from the output shaft 37. Consequently, a space-efficient arrangement of the balancer 171 is accomplished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit for a small vehicle, said power unit comprising:
   an internal combustion engine with a crankshaft; and
   a power transmission system the power transmission system being equipped with a continuously variable transmission;
   the continuously variable transmission having a drive shaft and a driven shaft arranged in parallel to the crankshaft;
   an axis of the drive shaft and an axis of the driven shaft being disposed below the axis of the crankshaft; and
   an output shaft for linking and interlocking with the driven shaft via a gear transmission system, an axis of the output shaft disposed above the drive shaft and driven shaft; further comprising a first line extending through the axis of the crankshaft and the axis of the drive shaft; the axis of the driven shaft, and the axis of the output shaft are arranged on one side of the first line.

2. The power unit for a small vehicle according to claim 1, further comprising a hydraulic clutch operatively mounted relative to the driven shaft between a driven pulley and a rear support wall, the hydraulics clutch includes a clutch outer and a clutch inner, said clutch outer including a cylindrical boss portion joined to the driven shaft and prevented from rotation, said clutch inner being coaxially mounted relative to the clutch outer and being supported by the driven shaft with a bearing to be freely rotatable relative to the driven shaft.

3. The power unit for a small vehicle according to claim 1, wherein said gear transmission system including a single idle shaft having an axis parallel to the crankshaft and being arranged between the driven shaft and the output shaft, said single idle shaft being provided between the driven shaft and the output shaft for rotating the driven shaft and the output shaft in the same direction.

4. The power unit for a small vehicle according to claim 3, wherein the gear transmission system includes a first gear, a second gear, a third gear and a fourth gear, said first gear being integrally formed with a clutch inner of a hydraulic clutch.

5. The power unit for a small vehicle according to claim 4, wherein the second gear meshes with the first gear and is fixed to the single idle shaft.

6. The power unit for a small vehicle according to claim 4, wherein the third gear is fixed to the single idle shaft and the fourth gear is in mesh with the third gear.

7. The power unit for a small vehicle according to claim 3, wherein the single idle shaft includes a first end portion being rotatably supported by a bearing to a front support wall and a second portion rotatably mounted relative to a rear support wall.

8. The power unit for a small vehicle according to claim 7, wherein a first end of the output shaft is rotatably supported by the rear support wall and a second end of the output shaft is rotatably mounted relative to a rear cover.

9. The power unit for a small vehicle according to claim 1, wherein the drive shaft and driven shaft are disposed below the axis of the output shaft.

10. A power unit comprising:
an internal combustion engine with a crankshaft; and
a power transmission system, the power transmission system being equipped with a continuously variable transmission;
said continuously variable transmission having a drive shaft and a driven shaft arranged in parallel to the crankshaft,
the drive shaft and driven shaft being disposed below an axis of the crankshaft; and
an output shaft interlocked with the driven shaft via a gear transmission system, an axis of the output shaft disposed above the continuously variable transmission; further comprising a first line extending through the axis of the crankshaft and an axis of the drive shaft; an axis of the driven shaft, and the axis of the output shaft are arranged on one side of the first line.

11. The power unit according to claim 10, further comprising a single idle shaft having an axis parallel to the crankshaft and being arranged between the driven shaft and the output shaft, said single idle shaft being provided between the driven shaft and the output shaft for rotating the driven shaft and the output shaft in the same direction.

12. The power unit according to claim 11, wherein the gear transmission system includes a first gear, a second gear, a third gear and a fourth gear, said first gear being integrally formed with a clutch inner of a hydraulic clutch.

13. The power unit according to claim 12, wherein the second gear meshes with the first gear and is fixed to the single idle shaft.

14. The power unit according to claim 12, wherein the third gear is fixed to the single idle shaft and the fourth gear is in mesh with the third gear.

15. The power unit according to claim 11, wherein the single idle shaft includes a first end portion being rotatably supported by a bearing to a front support wall and a second portion rotatably mounted relative to a rear support wall.

16. The power unit according to claim 15, wherein a first end of the output shaft is rotatably supported by the rear support wall and a second end of the output shaft is rotatably mounted relative to a rear cover.

17. The power unit according to claim 10, and further comprising:
a hydraulic clutch operatively mounted relative to the driven shaft between a driven pulley and a rear support wall, the hydraulics clutch includes a clutch outer and a clutch inner, said clutch outer including a cylindrical boss portion joined to the driven shaft and prevented from rotation, said clutch inner being coaxially mounted relative to the clutch outer and being supported by the driven shaft with a bearing to be freely rotatable relative to the driven shaft.

18. The power unit for a small vehicle according to claim 10, wherein the drive shaft and driven shaft are disposed below the axis of the output shaft.

* * * * *